Patented Nov. 21, 1933

1,935,661

UNITED STATES PATENT OFFICE 1,935,661

CYSTOGRAPHIC MEDIUM

Arnold E. Osterberg, Rochester, Minn., assignor to The Chemical Foundation Incorporated, New York, N. Y., a corporation of Delaware No Drawing. Application May 27, 1932
Serial No. 614,050

7 Claims. (Cl. 167—50)

The object of my invention is the production of a stable, non-viscous, radiopaque, liquid medium which is highly fluid, non-irritating, and innocuous to the inner surfaces of the bladders, sacs, and other vesicles of the body, when distended thereby, and which, furthermore, is inexpensive.

In studying the contour of such internal cavities as, for example, that of the urinary bladder, by means of Roentgenograms, the finest detail can only be brought out by an opaque liquid medium. Cystograms which have been made using air as the distending means lack detail; and this method is further limited in accuracy, utility and desirability because of interference by gas in the bowel.

Among the opaque media which have been used in the past are collargol (colloidal silver), argyrol (mild silver protein), thorium nitrate, and silver iodide emulsion. All these are relatively viscous, not stable, and comparatively expensive.

Viscous media are not adapted to the needs of Roentgenography because of their tendency to coat and exaggerate the outline of minimal protuberances and to fail to penetrate the finer trabeculations, and thus to obscure their morphic valence.

Non-viscous media such as sodium bromide and sodium iodide have therefore been tentatively substituted. Both of these drugs, in solution, are non-viscous and produce an excellent Roentgenographic shadow. They are, however, subject to the objection that when used in the necessary quantities, they may cause marked irritation, tenesmus and hematuria, causing pain to the patient.

The various drugs employed in intravenous urography have also been used extensively in making pyelograms by the retrograde method. Cystograms necessitate the use of from 5 to 8 ounces (150 to 240 c. c.) of solution, and the cost of so much iopax or skiodan is prohibitive.

These conditions of disadvantage have led physicians largely to discard cystography from their diagnostic armamentarium.

In searching for an inexpensive, highly-fluid, non-irritating, innocuous and non-viscous medium suitable for cystography, I have discovered that solutions of the alkaline bismuth tartrates and/or citrates avoid all the objections above stated and attain the recited objects of my invention. While I prefer the aqueous solutions of those bismuth tartrates resultant from the respective reactions of the sodium and potassium tartrate with bismuth subnitrate, the high degree of solubility in cold water possessed by potassium bismuth tartrate and sodium bismuth tartrate is common also to potassium bismuth citrate and sodium bismuth citrate, which substances likewise contain approximately 70 per cent. bismuth. If the bismuth content of these substances be reduced or falls substantially below 65 per cent., other bismuth compounds result which are relatively highly toxic, precluding their use for injection into body cavities. I prefer a 5 to 8 per cent. solution of the 70 per cent. bismuth tartrates as affording superior radiopacity. The solution will flow through the smallest catheter equally as well as water. Also, because of its fluidity, due to the solubility of these salts, the finest trabeculations and smallest cellules are easily demonstrated and a cystogram with very distinct outline results. Its use does not produce the slightest irritation or any other sign of harmful effect. Reflux into the kidney does not cause symptoms. As 15 c. c. of solution injected intravenously would be required to produce a toxic effect, it seems that the solution is an ideal preparation. In making pyelograms, the probability of a toxic quantity getting into the blood by pyelovenous extravasation is nil.

I may use either an aqueous solution of from 5 to 8 per cent. strength of sodium bismuth tartrate or of potassium bismuth tartrate, or a mixture of both, dependent upon the depth of the solution necessary to be penetrated by the X-ray, the strength of the solution being varied according to the capacity of the containing cavity. As above mentioned, I find that for the utilities of the invention, citric acid may be substituted for tartaric acid, to form the alkaline bismuth citrates, i. e. sodium bismuth citrate and potassium bismuth citrate, and I regard these citrates as the beneficial equivalents of the corresponding tartrates.

By the specific mention of the bladder and kidneys as the subjects of Roentgenography, I do not intend to be understood as limiting the utility of my discovery thereto, since it is equally adapted to cooperate in the production of skiagrams of other organic cavities, such as the colon, which are commonly Roentgenographed under conditions of artificial distension.

Having thus described my invention, I claim:

1. As a radiopaque medium for cystography, a cold-water soluble alkaline bismuth tartrate having a bismuth content not substantially below 65 per cent, said medium having the fluidity of water when in solution, and being stable, non-viscous, innocuous, and non-irritating.

2. As a liquid radiopaque medium for cystography, an aqueous solution of about 5 to 8 per cent. of an alkaline bismuth tartrate, containing approximately 70 per cent. bismuth, said medium having the fluidity of water, and being stable, non-viscous, innocuous and non-irritating.

3. As a liquid radiopaque medium for cystography, a 5 to 8 per cent. solution of sodium bismuth tartrate having a bismuth content not substantially below 65 per cent, said medium having the fluidity of water, and being stable, non-viscous, innocuous, and non-irritating.

4. As a liquid radiopaque medium for cystography, a 5 to 8 per cent. solution of potassium bismuth tartrate having a bismuth content not substantially below 65 per cent, said medium having the fluidity of water, and being stable, non-viscous, innocuous and non-irritating.

5. As a liquid radiopaque medium for cystography, an aqueous solution of an alkaline bismuth tartrate having a bismuth content above 65 per cent., said medium being highly fluid.

6. As a liquid radiopaque medium for cystography, sodium bismuth tartrate having a bismuth content not substantially below 65 per cent in aqueous solution.

7. As a liquid radiopaque medium for cystography, potassium bismuth tartrate having a bismuth content not substantially below 65 per cent in aqueous solution.

ARNOLD E. OSTERBERG.